United States Patent
Luo

(10) Patent No.: US 11,423,109 B2
(45) Date of Patent: Aug. 23, 2022

(54) INFORMATION PROCESSING METHOD, SERVER AND COMPUTER PROGRAM PRODUCT

(71) Applicant: SHENZHEN HEYTAP TECHNOLOGY CORP., LTD., Guangdong (CN)

(72) Inventor: Yue Luo, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 280 days.

(21) Appl. No.: 16/642,457

(22) PCT Filed: Aug. 31, 2017

(86) PCT No.: PCT/CN2017/100089
§ 371 (c)(1),
(2) Date: Feb. 27, 2020

(87) PCT Pub. No.: WO2019/041286
PCT Pub. Date: Mar. 7, 2019

(65) Prior Publication Data
US 2020/0192962 A1 Jun. 18, 2020

(51) Int. Cl.
*G06F 16/00* (2019.01)
*G06F 16/9538* (2019.01)
*G06F 7/08* (2006.01)

(52) U.S. Cl.
CPC .......... *G06F 16/9538* (2019.01); *G06F 7/08* (2013.01)

(58) Field of Classification Search
CPC ....... G06F 16/9538; G06F 7/08; G06F 16/903
See application file for complete search history.

(56) References Cited

U.S. PATENT DOCUMENTS

2011/0208731 A1   8/2011   Nicks
2013/0185292 A1*  7/2013   Li .................... G06F 16/2457
                                                       707/723
(Continued)

FOREIGN PATENT DOCUMENTS

CN   103020253   4/2013
CN   103957460   7/2014
(Continued)

OTHER PUBLICATIONS

Kolbertbot et al., "Google Play," Wikipedia, 2017, Retrieved from the Internet: <https://en.wikipedia.org/w/index.php?title=Google_Play&oldid=797771957>, 17 pages.
(Continued)

*Primary Examiner* — Jared M Bibbee
(74) *Attorney, Agent, or Firm* — Hodgson Russ LLP

(57) ABSTRACT

The embodiments of the present disclosure provide an information processing method and related product, the method includes: receiving a search request containing a keyword; searching in a preset application library to obtain a search result set according to the keyword, wherein the search result set comprises N applications; obtaining M applications from the N applications, wherein the M applications each comprises at least one APP ID related information and thereby the M applications comprise Q APP ID related information; updating the search result set according to the Q APP ID related information; and sending the search result set. The invention can improve the accuracy of the search result set.

20 Claims, 4 Drawing Sheets

(56) References Cited

U.S. PATENT DOCUMENTS

| | | | | |
|---|---|---|---|---|
| 2013/0283274 A1* | 10/2013 | Mimran | ................... | G06F 9/46 |
| | | | | 718/100 |
| 2015/0009152 A1* | 1/2015 | Tang | ................... | G06F 3/0484 |
| | | | | 345/173 |
| 2015/0234927 A1* | 8/2015 | Cao | ................... | G06F 16/90335 |
| | | | | 707/722 |
| 2015/0310113 A1* | 10/2015 | Yi | ...................... | G06F 16/9537 |
| | | | | 707/706 |
| 2016/0171589 A1* | 6/2016 | Glover | .............. | G06Q 30/0631 |
| | | | | 705/26.7 |

FOREIGN PATENT DOCUMENTS

| | | | | |
|---|---|---|---|---|
| CN | 105938494 | | 9/2016 | |
| CN | 106682196 | | 5/2017 | |
| WO | WO-2011012006 A1 * | 2/2011 | ........ | H04M 1/72522 |

OTHER PUBLICATIONS

EPO, Extended European Search Report for EP Application No. 17923947.0, dated Aug. 17, 2020.

IPO, Examination Report for IN Patent Application No. 202017013704, dated Sep. 7, 2021.

EPO, Office Action for EP Application No. 17923947.0, dated Oct. 8, 2021.

WIPO, ISR for PCT/CN2017/100089, May 22, 2018.

* cited by examiner

INFORMATION PROCESSING METHOD, SERVER AND COMPUTER PROGRAM PRODUCT

CROSS-REFERENCE TO RELATED APPLICATION

This application is a U.S. national phase application of International Application No. PCT/CN2017/100089, filed Aug. 31, 2017, the entire disclosure of which is incorporated herein by reference.

TECHNICAL FIELD

The present disclosure relates to a field of Internet technology, and particularly to an information processing method and related product.

BACKGROUND

With the rapid development of science and technology, mobile terminals such as smart phones, notebook computers, tablet computers, and desktop computers have been widely used in people's daily lives. In addition, various client software can be installed in the mobile terminal, such as an instant messaging client, an online shopping client, and an application market client. Among them, searching keyword in the application market client has become an important way for users to install application software.

In the prior art, when a user enters a keyword in a search bar of an application market client, a server corresponding to the application market client searches multiple applications associated with the keyword to obtain a search result set, and sends the search result set to the client.

SUMMARY

The embodiments of the present invention provide an information processing method and related product, which are used to solve the technical problem of a search failure when searching according to application identification (APP ID) related information of applications, and can improve the accuracy of a search result set.

In a first aspect, the embodiment of the present invention provides an information processing method, including:
  receiving a search request containing a keyword;
  searching in a preset application library to obtain a search result set according to the keyword, wherein the search result set includes N applications and the N is a positive integer;
  obtaining M applications from the N applications, wherein the M applications each includes at least one APP ID related information and thereby the M applications include Q APP ID related information, the M is a positive integer less than or equal to the N, and the Q is an integer greater than or equal to the M;
  updating the search result set according to the Q APP ID related information; and
  sending the search result set.

In a second aspect, the embodiment of the present invention provides an information processing device, including:
  a receiving unit, configured to receive a search request containing a keyword;
  a search unit, configured to search in a preset application library to obtain a search result set according to the keyword, wherein the search result set includes N applications and the N is a positive integer;
  an obtaining unit, configured to obtain M applications from the N applications, wherein the M applications each include at least one APP ID related information and thereby the M applications include Q APP ID related information, the M is a positive integer less than or equal to the N, and the Q is an integer greater than or equal to the M;
  an update unit, configured to update the search result set according to the Q APP ID related information;
  a sending unit, configured to send the search result set.

In a third aspect, the embodiments of the present invention provide a server including an input device, an output device, and a processor, wherein:
  the input device is configured to receive a search request containing a keyword;
  the processor is configured to search in a preset application library to obtain a search result set according to the keyword, wherein the search result set includes N applications and the N is a positive integer; obtain M applications from the N applications, wherein the M applications each includes at least one APP ID related information and thereby the M applications include Q APP ID related information, the M is a positive integer less than or equal to the N, and the Q is an integer greater than or equal to the M; and update the search result set according to the Q APP ID related information;
  the output device is configured to send the search result set.

In a fourth aspect, the embodiments of the present invention provide a server, including a processor, a memory, a communication interface, and one or more programs, wherein the one or more programs are stored in the memory and configured to be executed by the processor, the one or more programs include instructions for performing the method as described in the first aspect of the embodiments of the present invention.

In a fifth aspect, the embodiments of the present invention provide a computer-readable storage medium configured to store a computer program, wherein the computer program causes a computer to perform some or all operations described in the first aspect of the embodiments of the invention.

In a sixth aspect, the embodiments of the present invention provide a computer program product, wherein the computer program product includes a non-transitory computer-readable storage medium storing a computer program, the computer program is operable to cause a computer to perform some or all operations described in the first aspect of the embodiments of the invention. The computer program product can be a software installation package.

BRIEF DESCRIPTION OF THE DRAWINGS

In order to explain the embodiments of the invention or the technical solutions in the prior art more clearly, the following will give a brief introduction to the drawings needed in the embodiments or the related art description. It is obvious that the drawings in the following description are only some embodiments of the invention. For those skilled in the art, without any creative work, they can also obtain other drawings as be described in accordance with these drawings.

Wherein.

DETAILED DESCRIPTION

In order to enable those skilled in the art to better understand the solutions of the present invention, the technical solutions in the embodiment of the invention will be described clearly and completely below in combination with the drawings in the embodiment of the invention. Obviously, the described embodiment is only one part of the embodiment of the invention, not all of the embodiments. Based on the embodiments in the invention, all other embodiments obtained by those skilled in the art without creative labor belong to the scope of protection of the invention.

The terms "first", "second" and the like in the description and claims of the invention and the above drawings are used to distinguish different objects, not to describe a specific order. In addition, the terms "include" and "have" and any deformation of them are intended to cover non-exclusive inclusion. For example, a process, method, system, product or device that contains a series of steps or units is not limited to the listed steps or units, but optionally also includes the steps or units that are not listed, or optionally includes other steps or units that are fixed to these processes, methods, products or devices.

Referring to "embodiments" herein means that specific features, structures, or features described in connection with embodiments may be included in at least one embodiment of the invention. The appearances of this phrase in various places in the specification are not necessarily all referring to the same embodiment, nor are they independent or alternative embodiments that are mutually exclusive with other embodiments. It is explicitly and implicitly understood by those skilled in the art that the embodiments described herein may be combined with other embodiments.

Figure 1:
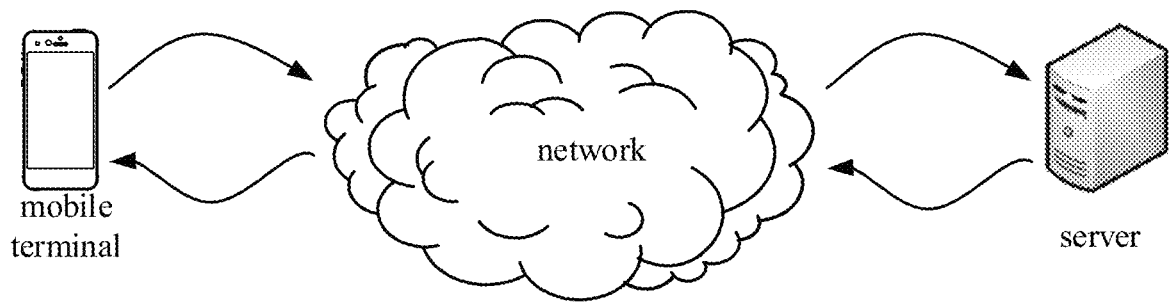
FIG. 1 is a schematic view of a network architecture according to embodiments of the present disclosure.

Before introducing the information processing method provided by the embodiments of the present invention, the application scenarios involved in the embodiment of the present invention are first introduced. The schematic view of the network architecture shown in FIG. 1 can include at least one mobile terminal and a server.

The mobile terminal involved in the embodiments of the present invention can include various handheld devices with wireless communication functions, vehicle-mounted devices, wearable devices, computing devices or other processing devices connected to a wireless modem, and various forms of user equipment (UE), mobile station (MS), terminal device, and so on. For the convenience of description, the devices mentioned are collectively referred to as mobile terminals.

The server involved in the embodiment of the present invention can be a server, or a server cluster composed of several servers, or a cloud computing service center. The server can receive a search request sent by the mobile terminal, perform a search according to the search request, and send the search result set corresponding to the search request to the mobile terminal.

The preset application library involved in the embodiment of the present invention can be an application library on a server corresponding to the application market client on the mobile terminal, or can be an application library on a server corresponding to a third-party application market client. The embodiments of the present invention are described in detail below.

The embodiments of the present invention provide an information processing method and related products, which are used to solve the technical problem of a search failure when searching according to APP ID related information of applications, and can improve the accuracy of a search result set.

Figure 2:
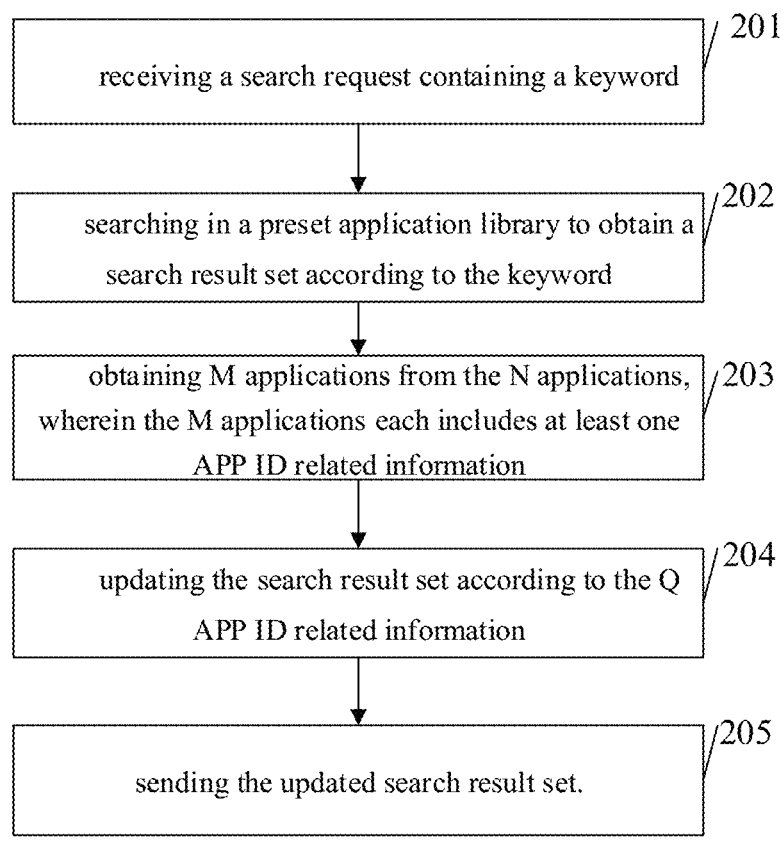
FIG. 2 is a schematic flowchart view of an information processing method according to an embodiment of the present disclosure.

In a first aspect, the embodiments of the present invention provide an information processing method. Specifically, as shown in FIG. 2, the information processing method includes:

201: receiving a search request containing a keyword.

In the embodiment of the present invention, the mobile terminal sends a search request containing the keyword submitted by a user on the mobile terminal to the server through the network. There is no limitation on how the user submits the search request containing keyword on the mobile terminal. It can be a search request that is submitted by a user after inputting the keyword through the input method of the mobile terminal, or a search request that is submitted by converting a voice input by the user through a microphone into the keyword through a speech recognition technology. It can also a search request submitted after a recommended application selected by the user and so on.

202: searching in a preset application library to obtain a search result set according to the keyword.

The search result set includes N applications, and the N is a positive integer.

In the embodiment of the present invention, there is no limitation on how to obtain the search result set according to the keyword. It can use the keyword and APP ID to search application resources directly, or the keyword can be split or combined to search for corresponding association words or synonyms, and it can also search applications that are consistent with the tags of applications corresponding to the keyword and so on.

For example, if the keyword is news consulting, the applications whose application identifier is news consulting can be obtained by searching the keyword. By splitting or combining the keyword to obtain a plurality of association words or synonyms and searching the plurality of association words or synonyms, the APP ID can be obtained as the first news, consulting friends, daily news, etc. By searching applications with consistent application tags, the first news, consulting friends, micro-news, everyone consulting, and so on can be obtained as the APP ID.

Optionally, the operation of obtaining R applications corresponding to the keyword includes the operations of obtaining R applications corresponding to the keyword; obtaining a ratio of downloads to views of each of the R applications to obtain R ratios; sorting the R ratios in a descending order, and obtaining applications corresponding to the first N ratios to obtain the search result set.

Among them, the R is an integer greater than N; the downloads is the number of downloads of the application in the preset application library; and the views is times that the user has been detected to browse the application in the preset application library.

In other words, according to the keyword, R applications corresponding to related words can be searched in the preset application library, and N applications with a higher ratio of downloads to views in the R applications will be displayed in priority. Instead of showing all the R applications associated with the keyword, the search efficiency of the server is improved, and the mobile terminal only needs to display the position of the N applications when displaying the search result set, rather than displaying the R applications, thereby saving display space of the mobile terminal and the browsing time of users.

The operation of obtaining R applications corresponding to the keyword includes splitting and combining the keyword to obtain a plurality of related words, and searching the R applications corresponding to the plurality of related words in the preset application library.

That is, by splitting or combing the keyword, the corresponding association words or synonyms are searched to obtain the plurality of related words of the keyword, and R applications corresponding to the related words are searched in the preset application library.

203: obtaining M applications from the N applications, wherein the M applications each includes at least one APP ID related information.

Among them, the APP ID related information includes at least the previous name information and the alias information. For example, the previous name information of the APP ID as Ali Planet is tiantian dongting, and the alias information of the APP ID as youhuitong is Sinopec. The M applications include Q APP ID related information, the M is a positive integer less than or equal to N, and the Q is an integer greater than or equal to M. That is, each of the M applications includes at least one APP ID related information.

204: updating the search result set according to the Q APP ID related information.

In the embodiment of the present invention, there is no limitation on how to update the search result set according to the Q APP ID related information. It is assumed that L applications are deleted from M applications according to the Q APP ID related information, and the remaining M-L applications are displayed. That is, L applications is deleted in the search result set. It should be noted that there are also N-M applications that do not include APP ID related information in the N applications, and the N-M applications in the search result set will not be updated.

Among them, L is a positive integer less than or equal to M, and the L applications can be non-hot applications among the M applications, or applications including the APP ID related information that do not match the keyword, and so on.

Optionally, the operation of updating the search result set according to the Q APP ID related information includes obtaining a matching value between each of the Q APP ID related information and the keyword to obtain Q matching value, selecting L matching values that less than a first preset threshold value from the Q matching values, and deleting one or more applications which include the APP ID related information corresponding to the L matching values in the search result set.

The matching value between the APP ID related information and the keyword can be a matching value between the corresponding text, or a matching value between the keyword and application description generated according to the APP ID related information. In other words, when the matching value between the APP ID related information and the keyword is less than the first preset threshold, one or more applications which include the APP ID related information in the search result set will be deleted. When the matching value between the APP ID related information and the keyword is greater than or equal to the first preset threshold, one or more applications which include the APP ID related information in the search result set will not be updated.

For example, it is supposed that the keyword is news, the first preset threshold is 0.5, and the search result set includes applications whose APP ID is first news, news consulting, and current affairs news. Among them, the previous name of the current affairs news is daily news, and the alias of news consulting is love consulting. The match value of daily news and news is obtained as 0.5, which is equal to the first preset threshold. The match value of love consulting and news is obtained as 0.1, which is less than the first preset threshold. The application which includes the love consulting as the APP ID related information in the search result will be deleted. That is, the application which includes the news consulting as the APP ID in the search result is deleted. The updated search result set includes applications whose APP ID is the first news and current affairs news.

Optionally, the operation of updating the search result set according to the Q APP ID related information includes searching history search records to obtain K search request records each containing the keyword, wherein the K is a positive integer; and updating the search result set according to the K search request records.

Among them, the K search request records can be sent from the mobile terminal to the server, or the K search request records are received by the server. The search result set is updated according to the history search records of the keyword, which can supplement applications that are closely related to the keyword to the search result sets. When the application name changes, it also can select applications in the search result set effectively, improving the accuracy of the search result set.

Optionally, the operation of updating the search result set according to the K search request records includes: obtaining search times of each of the Q APP ID related information from the K search request records to obtain Q search times; selecting L search times less than a second preset threshold from the Q search times, wherein the L is a positive integer less than or equal to the M; and deleting one or more applications which include the APP ID related information corresponding to the L search times in the search result set.

The second preset threshold value can be a preset value, or a value corresponding to a fixed ratio of K, and so on. When the search times of the APP ID related information is less than the second preset threshold, the application which includes the APP ID related information in the search result set will be deleted. When the search times of the APP ID related information is greater than or equal to the second preset threshold, the application which includes the APP ID related information in the search result set will be not updated.

For example, it is supposed that the keyword is news, and the search result set includes applications whose APP ID is first news, news consulting, and current affairs news. Among them, the previous name of the current affairs news is daily news, and the alias of news consulting is love consulting. The history search records received by the server is searched to obtain search requests containing news, and 234 search request records are obtained. If the second preset threshold is 50% of the number of the search request records, the second preset threshold is 117. The search times of daily news is 210 and the search times of love consulting is 100. The search times of love consulting is less than the second preset threshold. The application which includes the love consulting as the APP ID related information in the search result will be deleted. That is, the application which includes the news consulting as the APP ID in the search result is deleted. The updated search result set includes applications whose APP ID is the first news and current affairs news.

Optionally, after the operation of searching history search records to obtain K search request records containing the keyword, the method further including: obtaining search times of target APP ID related information, when the K search request records contain one or more target applications corresponding to the target APP ID related information which are inconsistent with the Q APP ID related information; adding the one or more target applications to the search result set, when the search times of the target APP ID related information are greater than or equal to the second preset threshold.

That is to say, if there is one or more target application corresponding to the target APP ID related information which are inconsistent with the Q APP ID related information in the K search request records, and the search times of the target APP ID related information is greater than or equal to the second preset threshold, the target application and the related words are associated with each other, then the target application is added to the search result set, and the accuracy of the search result is improved.

For example, it is supposed that the keyword is news, and the search result set includes applications whose APP ID is first news, news consulting, and current affairs news. Among them, the previous name of the current affairs news is daily news, and the alias of news consulting is love consulting. The history search records received by the server is searched to obtain search requests containing news, and 234 search request records are obtained. In the 234 search request records, the search times of daily news is 210 and the search times of love consulting is 100, and the search times of constant news which is inconsistent with daily news and love consulting is 168. If the second preset threshold is 50% of the number of the search request records, the second preset threshold is 117. The search times of loving new is less than the second preset threshold, and the search times of daily news and constant news are greater than the second preset threshold. The application which includes the love consulting as the APP ID related information in the search result will be deleted. That is, the application which includes the news consulting as the APP ID in the search result is deleted. The application corresponding to constant news is added. If the constant news is the previous name of the news go on, the application whose APP ID is news go on will be added. The updated search result set includes the applications whose APP ID is first news, current affairs news and news go on.

Optionally, after the operation of updating the search result set according to the Q APP ID related information, the method further includes: establishing an association relationship between the keyword and the search result set, and storing the association relationship.

That is to say, after updating the search result set, the association relationship between the keyword and the search result set is established. The next time when the user search for the keyword, the server can directly obtain the search result set according to the association relationship between the keyword and the search result set, instead of searching history search records, so as to improve the search efficiency.

205: sending the search result set.

After the server obtains the search result set, it sends the search result set to the mobile terminal and the mobile terminal displays the search result set. The embodiments of the invention do not limit how the mobile terminal displays according to the search result set. Display content of the application in the search result set can be just an application name or an application icon, or at least one screenshot of the resource that is started or run in the application, or a recommended small video, a guide video or a link to the application which can be clicked to view more detailed introduction video and so on. The display order of the applications in the search result set can be based on the matching value between the keyword and the APP ID or the time when the application is searched.

In the information processing method as shown in FIG. 2, after receiving the search request containing the keyword sent by the mobile terminal, the server searches in the preset application library to obtain the search result set which includes N applications according to the keyword, obtains M applications from the N applications, updates the search result set according to the Q APP ID related information included in the M applications; and send the updated search result set to the mobile terminal. The M applications each includes at least one APP ID related information. In other words, if an application in the search result set includes at least one APP ID related information, the search result set is updated according to the APP ID related information of the application, instead of being returned to the mobile terminal after the search result set is obtained, which improves the accuracy of the search result set.

Figure 3:
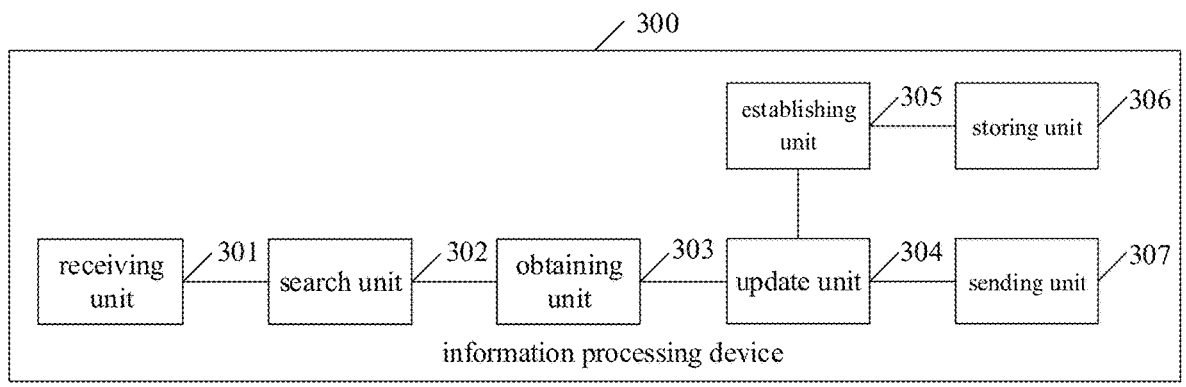
FIG. 3 is a schematic structural view of an information processing device according to an embodiment of the present invention.

In accordance with the embodiment of FIG. 2, please refer to FIG. 3, an information processing device is provided by the embodiments of the present invention. Specifically, as shown in FIG. 3, the information processing device 300 includes:

a receiving unit 301, configured to receive a search request containing a keyword;

a search unit 302, configured to search in a preset application library to obtain a search result set according to the keyword, wherein the search result set includes N applications and the N is a positive integer.

Figure 3A:
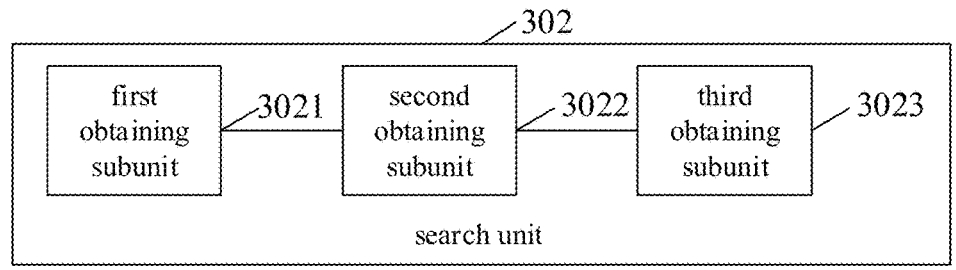
FIG. 3A is a schematic structural view of a search unit according to an embodiment of the present invention.

Optionally, as shown in FIG. 3A, the search unit 302 includes:

a first obtaining subunit 3021, configured to obtain R applications corresponding to the keyword, wherein the R is an integer greater than N;

a second obtaining subunit 3022, configured to obtain a ratio of downloads to views of each of the R applications to obtain R ratios;

a third obtaining subunit 3023, configured to sort the R ratios in a descending order, and obtain applications corresponding to the first N ratios to obtain the search result set.

Figure 3B:
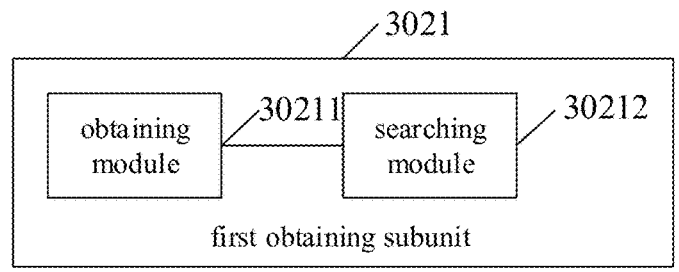
FIG. 3B is a schematic structural view of a first obtaining subunit according to an embodiment of the present invention.

Optionally, as shown in FIG. 3B, the first obtaining subunit 3021 includes:

a first obtaining module 30211, configured to split and combine the keyword to obtain a plurality of related words;

a searching module 30212, configured to search the R applications corresponding to the plurality of related words in the preset application library.

In the embodiment of the invention, as shown in FIG. 3, the device 300 also includes:

an obtaining unit 303, configured to obtain M applications from the N applications, wherein the M applications each include at least one APP ID related information and thereby the M applications include Q APP ID related information, the M is a positive integer less than or equal to the N, and the Q is an integer greater than or equal to the M;

an update unit 304, configured to update the search result set according to the Q APP ID related information.

Figure 3C:
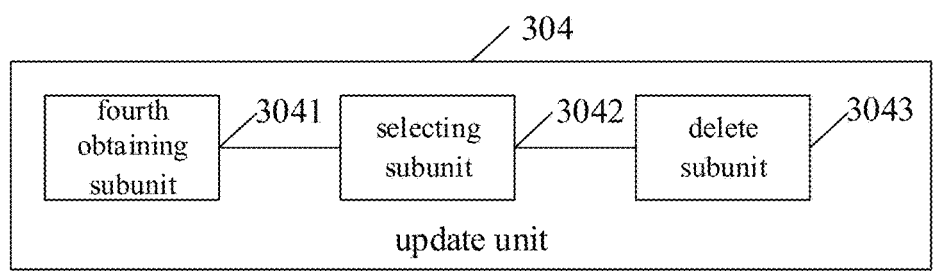
FIG. 3C is a schematic structural view of an update unit according to an embodiment of the present invention.

Optionally, as shown in FIG. 3C, the update unit 304 includes:

a fourth obtaining subunit 3041, configured to obtain a matching value between each of the Q APP ID related information and the keyword to obtain Q matching values;

a selecting subunit 3042, configured to select L matching values that less than a first preset threshold value from the Q matching values, wherein the L is a positive integer less than or equal to the M;

a delete subunit 3043, configured to delete one or more applications which include APP ID related information corresponding to the L matching values in the search result set.

Figure 3D:
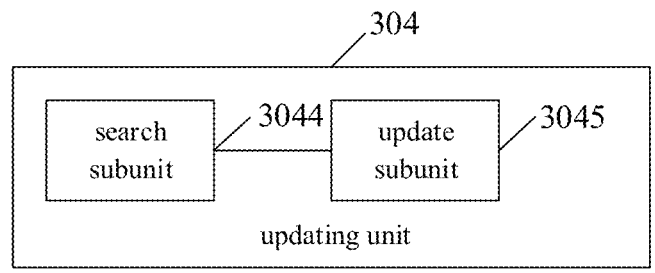
FIG. 3D is another schematic structural view of an update unit according to an embodiment of the present invention.

Optionally, as shown in FIG. 3D, the updating unit 304 includes:

a search subunit 3044, configured to search history search records to obtain K search request records each containing the keyword, wherein the K is a positive integer;

an update subunit 3045, configured to update the search result set according to the K search request records.

Figure 3E:
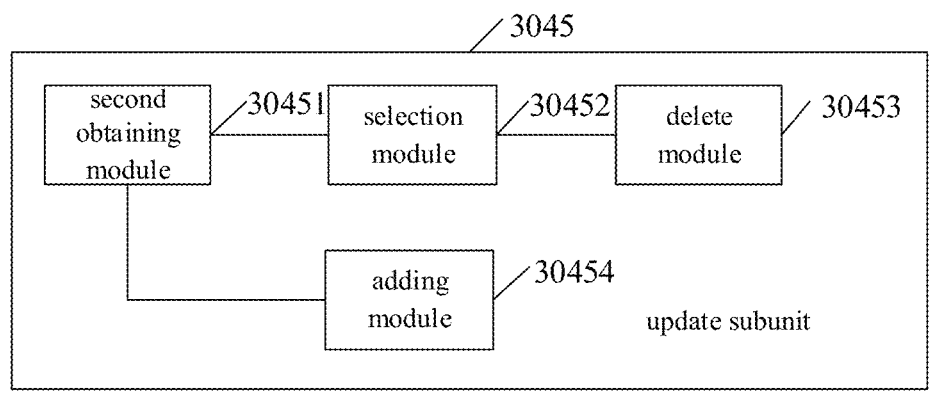
FIG. 3E is a schematic structural view of an update subunit according to an embodiment of the present invention.

Optionally, as shown in FIG. 3E, the update subunit 3045 includes:

a second obtaining module 30451, configured to obtain search times of each of the Q APP ID related information from the K search request records to obtain Q search times;

a selection module 30452, configured to select L search times less than a second preset threshold from the Q search times, wherein the L is a positive integer less than or equal to the M;

a delete module 30453, configured to delete one or more applications which include the APP ID related information corresponding to the L search times in the search result set.

Optionally, as shown in FIG. 3E, the second obtaining module 30451 is also configured to obtain search times of target APP ID related information, when the K search request records contain one or more target applications corresponding to the target APP ID related information which are inconsistent with the Q APP ID related information;

The update subunit 3045 also includes:

an adding module 30454, configured to add the one or more target applications to the search result set, when the search times of the target APP ID related information are greater than or equal to the second preset threshold.

Optionally, as shown in FIG. 3, the device 300 also includes:

an establishing unit 305, configured to establish an association relationship between the keyword and the search result set; and a storing unit 306, configured to store the association relationship.

In the embodiments of the invention, as shown in FIG. 3, the device 300 also includes:

a sending unit 307, configured to send the search result set.

In the information processing device as shown in FIG. 3, after receiving the search request containing the keyword sent by the mobile terminal, the server searches in the preset application library to obtain the search result set which includes N applications according to the keyword, obtains M applications from the N applications, updates the search result set according to the Q APP ID related information included in the M applications; and send the updated search result set to the mobile terminal. The M applications each includes at least one APP ID related information. In other words, if an application in the search result set includes at least one APP ID related information, the search result set is updated according to the APP ID related information of the application, instead of being returned to the mobile terminal after the search result set is obtained, which improves the accuracy of the search result set.

Figure 4:
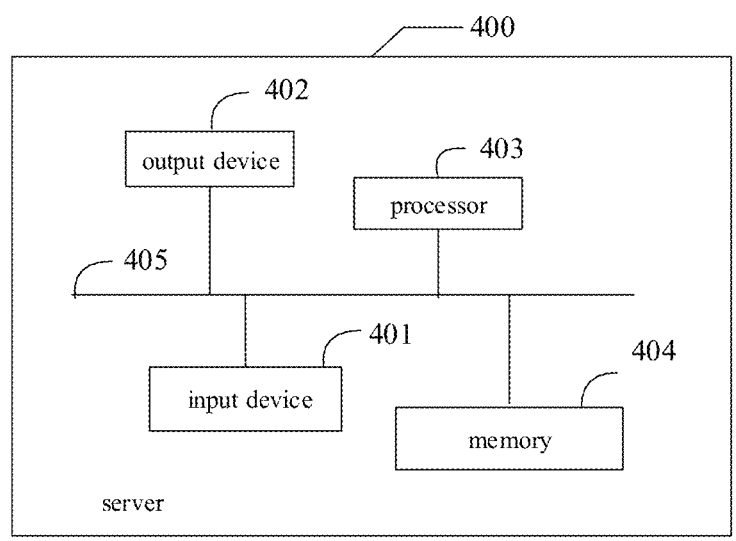
FIG. 4 is a schematic structural view of a server according to an embodiment of the present invention.

In accordance with the embodiments of FIG. 2, please refer to FIG. 4, a structural view of a server is provided by the embodiment of the invention. Specifically, as shown in FIG. 4, the server 400 includes at least one input device 401; at least one output device 402; and at least one processor 403, such as central processing unit (CPU); and at least one memory 404, wherein the input device 401, the output device 402, the processor 403 and the memory 404 are connected through bus 405.

The input device 401 can be a touch panel, a physical key or a mouse.

The output device 402 can be a display screen.

The memory 404 can be high-speed random access memory (RAM) or non-volatile memory, such as a disk memory. The memory 404 is used for storing a set of program codes, and the input device 401, the output device 402 and the processor 403 are used for calling the program codes stored in the memory 404 to perform the following operations.

The input device 401 is used for receiving the search request containing the keyword.

The memory 404 is configured to store the first preset threshold, the history search record, the second preset threshold, the association relationship between the keyword and the search result set, and downloads and the views of each application in the preset application library.

The processor 403 is configured to search in a preset application library to obtain a search result set according to the keyword, wherein the search result set includes N applications and the N is a positive integer; obtain M applications from the N applications, wherein the M applications each includes at least one APP ID related information and thereby the M applications include Q APP ID related information, the M is a positive integer less than or equal to the N, and the Q is an integer greater than or equal to the M; and update the search result set according to the Q APP ID related information.

Optionally, in an aspect of the processor 403 searching in a preset application library to obtain a search result set according to the keyword, the processor 403 is also used to obtain R applications corresponding to the keyword, wherein the R is an integer greater than N; obtain a ratio of downloads to views of each of the R applications to obtain R ratios; and sort the R ratios in a descending order, and obtain applications corresponding to the first N ratios to obtain the search result set.

Among them, in an aspect of obtaining R applications corresponding to the keyword by the processor 403, the processor 403 is specifically used to split and combine the keyword to obtain a plurality of related words; and search the R applications corresponding to the plurality of related words in the preset application library.

Optionally, in an aspect of updating the search result set according to the Q APP ID related information by the processor 403, the processor 403 is specifically used to obtain a matching value between each of the Q APP ID related information and the keyword to obtain Q matching values; select L matching values that less than a first preset threshold value from the Q matching values, wherein the L is a positive integer less than or equal to the M; delete one or more applications which include the APP ID related information corresponding to the L matching values in the search result set.

Optionally, in an aspect of updating the search result set according to the Q APP ID related information by the processor 403, the processor 403 is specifically used to search history search records to obtain K search request records each containing the keyword, wherein the K is a positive integer; and update the search result set according to the K search request records.

Optionally, in an aspect of updating the search result set according to the K search request records by the processor 403, the processor 403 is specifically used to obtain search times of each of the Q APP ID related information from the K search request records to obtain Q search times; select L search times less than a second preset threshold from the Q search times, wherein the L is a positive integer less than or equal to the M; and delete one or more applications which include the APP ID related information corresponding to the L search times in the search result set.

Optionally, after searching history search records to obtain K search request records containing the keyword by the processor 403, the processor 403 is also used to obtain search times of target APP ID related information, when the K search request records contain one or more target applications corresponding to the target APP ID related information which are inconsistent with the Q APP ID related information; and add the one or more target applications to the search result set, when the search times of the target APP ID related information are greater than or equal to the second preset threshold.

Optionally, after updating the search result set according to the Q APP ID related information by the processor 403, the processor 403 is also used to establish an association relationship between the keyword and the search result set, and store the association relationship.

In the embodiment of the present invention, the output device 402 is used to send the search result set.

In the server shown in FIG. 4, after receiving the search request containing the keyword sent by the mobile terminal, the server searches in the preset application library to obtain the search result set which includes N applications according to the keyword, obtains M applications from the N applications, updates the search result set according to the Q APP ID related information included in the M applications; and send the updated search result set to the mobile terminal. The M applications each includes at least one APP ID related information. In other words, if an application in the search result set includes at least one APP ID related information, the search result set is updated according to the APP ID related information of the application, instead of being returned to the mobile terminal after the search result set is obtained, which improves the accuracy of the search result set.

Figure 5:
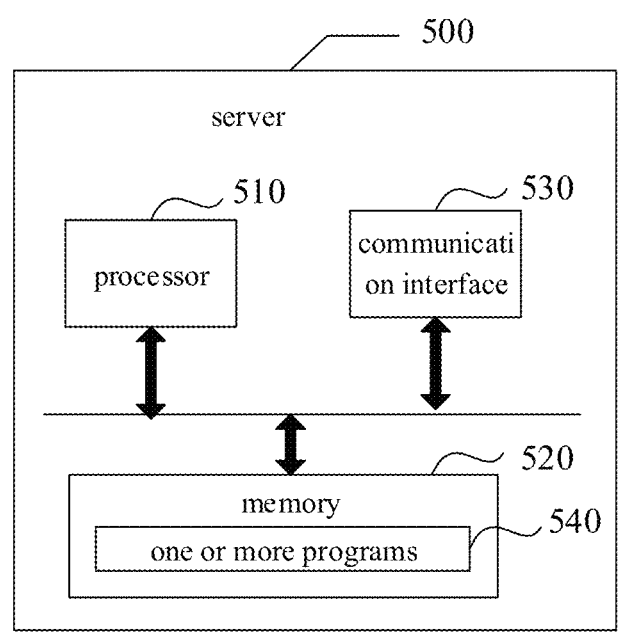
FIG. 5 is another schematic structural view of a server according to an embodiment of the present invention.

In accordance with the embodiment of FIG. 2, please refer to FIG. 5 a server IS provided by the embodiments of the invention. As shown in FIG. 5, the server 500 includes: a processor 510, a memory 520, a communication interface 530 and one or more programs 540, wherein the one or more programs 540 are stored in the memory 520 and configured to be executed by the processor 510. The one or more programs 540 includes the following instructions:

receiving a search request containing a keyword;

searching in a preset application library to obtain a search result set according to the keyword, wherein the search result set includes N applications and the N is a positive integer;

obtaining M applications from the N applications, wherein the M applications each includes at least one APP ID related information and thereby the M applications include Q APP ID related information, the M is a positive integer less than or equal to the N, and the Q is an integer greater than or equal to the M;

updating the search result set according to the Q APP ID related information; and sending the search result set.

As an optional embodiment, in the aspect of updating the search result set according to the Q APP ID related information, the instructions in the one or more programs 540 are specifically used to perform the following steps:

obtaining a matching value between each of the Q APP ID related information and the keyword to obtain Q matching values;

selecting L matching values that less than a first preset threshold value from the Q matching values, wherein the L is a positive integer less than or equal to the M;

deleting one or more applications which include the APP ID related information corresponding to the L matching values in the search result set.

As an optional embodiment, in the aspect of updating the search result set according to the Q APP ID related information, the instructions in the programs 540 are specifically used to perform the following steps:

searching history search records to obtain K search request records each containing the keyword, wherein the K is a positive integer;

updating the search result set according to the K search request records.

As an optional embodiment, in the aspect of updating the search result set according to the K search request records, he instructions in the programs 540 are specifically used to perform the following steps:

obtaining search times of each of the Q APP ID related information from the K search request records to obtain Q search times;

selecting L search times less than a second preset threshold from the Q search times, wherein the L is a positive integer less than or equal to the M;

deleting one or more applications which include the APP ID related information corresponding to the L search times in the search result set.

As an optional embodiment, after the operation of searching history search records to obtain K search request records each containing the keyword, the instructions in the programs 540 is also used to perform the following steps:

obtaining search times of target APP ID related information, when the K search request records contain one or more target applications corresponding to the target APP ID related information which are inconsistent with the Q APP ID related information;

adding the one or more target applications to the search result set, when the search times of the target APP ID related information are greater than or equal to the second preset threshold.

As an optional embodiment, after the operation of updating the search result set according to the Q APP ID related information, the instructions in the program 540 are also used to perform the following steps:

establishing an association relationship between the keyword and the search result set, and storing the association relationship.

As an optional embodiment, in the aspect of searching in a preset application library to obtain a search result set according to the keyword, the instructions in the programs 540 are specifically used to perform the following steps:

obtaining R applications corresponding to the keyword, wherein the R is an integer greater than N;

obtaining a ratio of downloads to views of each of the R applications to obtain R ratios;

sorting the R ratios in a descending order, and obtaining applications corresponding to the first N ratios to obtain the search result set.

As an optional embodiment, in the aspect of obtaining R applications corresponding to the keyword, the instructions in the program 540 are specifically used to perform the following steps:

splitting and combining the keyword to obtain a plurality of related words;

searching the R applications corresponding to the plurality of related words in the preset application library.

In the server shown in FIG. 5, after receiving the search request containing the keyword sent by the mobile terminal, the server searches in the preset application library to obtain the search result set which includes N applications according to the keyword, obtains M applications from the N applications, updates the search result set according to the Q APP ID related information included in the M applications; and send the updated search result set to the mobile terminal. The M applications each includes at least one APP ID related information. In other words, if an application in the search result set includes at least one APP ID related information, the search result set is updated according to the APP ID related information of the application, instead of being returned to the mobile terminal after the search result set is obtained, which improves the accuracy of the search result set.

The embodiments of the present invention also provide a computer storage medium, wherein the computer storage medium is used to store computer programs, which enable the computer to perform some or all steps of any method as described in the embodiments of the method, and the computer includes a server.

The embodiments of the present invention also provide a computer program product, which includes a non-transitory computer readable storage medium for storing computer programs, and the computer programs can be operated to enable the computer to perform some or all steps of any method as described in the embodiments of the method. The computer program product can be a software installation package, and the computer includes a server.

Although the invention is described in combination with the embodiments, in the process of implementing the claimed invention, those skilled in the art can understand and realize other changes in the disclosed embodiments by looking at the drawings, the disclosed contents and the appended claims. In the claims, the word "comprising" does not exclude other components or steps, and "one" does not exclude multiple cases. A single processor or other unit may realize several functions enumerated in the claim. Some measures are recorded in different dependent claims, but this does not mean that these measures cannot be combined to produce better results.

Those skilled in the art should understand that embodiments of the invention may be provided as methods, devices, or computer program products. Therefore, the present invention may take the form of a complete hardware embodiment, a complete software embodiment, or an embodiment combining software and hardware. Moreover, the invention can adopt the form of computer program products implemented on one or more computer available storage media (including but not limited to disk memory, CD-ROM, optical memory, etc.) including computer available program codes. Computer programs are stored/distributed in a suitable medium, which is provided with or as part of other hardware, or in other forms of distribution, such as through the Internet or other wired or wireless telecommunications systems.

The invention is described with reference to the flow chart and/or block diagram of the method, device and computer program product of the embodiment of the invention. It should be understood that each flow and/or block in the flow chart and/or block diagram and the combination of flow and/or block in the flow chart and/or block diagram can be realized by computer program instructions. These computer program instructions can be provided to a general-purpose computer, special-purpose computer, embedded processor or processor of other programmable data processing equipment to generate a machine. So the instructions generated by the processor of a computer or other programmable data processing equipment are used to realize the device for the specified function in one or more processes or one or more flow chart and one or more block charts.

These computer program instructions may also be stored in a computer-readable memory capable of guiding a computer or other programmable data processing device to work in a specific way, so that the instructions stored in the computer-readable memory generate a manufacturing article including an instruction device. And the instruction device performs a specified function in one or more flow chart and one or more block charts.

These computer program instructions can also be loaded on a computer or other programmable data processing device, so that a series of operation steps are executed on the computer or other programmable device to generate computer implemented processing. So the instructions executed on the computer or other programmable device provide steps for specified functions in one or more flowcharts or one or more block charts.

Although the invention is described in combination with specific features and embodiments, it is obvious that various modifications and combinations can be made without departing from the spirit and scope of the invention. Accordingly, the specification and the accompanying drawings are only exemplary descriptions of the invention as defined in the appended claims, and are deemed to have covered any and all modifications, changes, combinations or equivalents within the scope of the invention. Obviously, those skilled in the art can make various changes and modifications to the invention without departing from the spirit and scope of the invention. In this way, if these modifications and variations of the invention fall within the scope of the claims of the invention and its equivalent technology, the invention also intends to include these modifications and variations.

What is claimed is:

1. An information processing method, comprising:

receiving a search request containing a keyword;

searching in a preset application library to obtain a search result set according to the keyword, wherein the search result set comprises N applications and N is a positive integer;

obtaining M applications from the N applications, wherein the M applications each comprises at least one application identification (APP ID)-related information and thereby the M applications comprise Q pieces of APP ID-related information, M is a positive integer less than or equal to N, and Q is a positive integer greater than or equal to M;

updating the search result set according to the Q pieces of APP ID-related information, comprising:

searching history search records to obtain K search request records each containing the keyword, wherein K is a positive integer;

obtaining search times of each of the Q pieces of APP ID-related information from the K search request records to obtain Q search times;

selecting L search times less than a second preset threshold from the Q search times, wherein L is a positive integer less than or equal to M; and deleting one or more applications which comprise the APP ID-related information corresponding to the L search times in the search result set; and sending the updated search result set.

2. The method of claim 1, wherein the operation of updating the search result set according to the Q pieces of APP ID-related information, further comprises:

obtaining a matching value between each of the Q pieces of APP ID-related information and the keyword to obtain Q matching values;

selecting L matching values that less than a first preset threshold value from the Q matching values, wherein L is a positive integer less than or equal to M;

deleting one or more applications which comprise the APP ID-related information corresponding to the L matching values in the search result set.

3. The method of claim 2, wherein the matching value is between the keyword and application description generated according to the APP ID-related information.

4. The method of claim 1, after the operation of searching history search records to obtain K search request records each containing the keyword, the method further comprising:

obtaining search times of target APP ID-related information, when the K search request records contain one or more target applications corresponding to the target APP ID-related information which are inconsistent with the Q pieces of APP ID-related information;

adding the one or more target applications to the search result set, when the search times of the target APP ID-related information are greater than or equal to the second preset threshold.

5. The method of claim 4, after the operation of updating the search result set according to the Q pieces of APP ID-related information, the method further comprising:

establishing an association relationship between the keyword and the search result set, and storing the association relationship.

6. The method of claim 1, the operation of searching in a preset application library to obtain a search result set according to the keyword comprising:

obtaining R applications corresponding to the keyword, wherein the R is an integer greater than N;

obtaining a ratio of downloads to views of each of the R applications to obtain R ratios;

sorting the R ratios in a descending order, and obtaining applications corresponding to the first N ratios to obtain the search result set.

7. The method of claim 6, the operation of obtaining R applications corresponding to the keyword comprising:

splitting and combining the keyword to obtain a plurality of related words;

searching the R applications corresponding to the plurality of related words in the preset application library.

8. The method of claim 1, wherein the K search request records are sent from a mobile terminal to a server, or the K search request records are received by a server.

9. The method of claim 1, wherein the second preset threshold is a preset value, or the second preset threshold is a value corresponding to a preset ratio of K.

10. The method of claim 1, wherein display content of the application in the search result set comprises at least one of the following:

an application name or application icon;

at least one screenshot of the resource that is started or run in the application; and a recommended small video, a guide video, or a link to the application.

11. The method of claim 1, wherein the display order of the applications in the search result set is based on a matching value between the keyword and the APP ID or the time when the application is searched.

12. The method of claim 1, wherein the APP ID-related information comprises at least a previous name information and an alias information of an application.

13. A server, comprising an input device, an output device, and a processor, wherein:

the input device is configured to receive a search request containing a keyword;

the processor is configured to search in a preset application library to obtain a search result set according to the keyword, wherein the search result set comprises N applications and N is a positive integer;

obtain M applications from the N applications, wherein the M applications each comprises at least one application identification (APP ID)-related information, and the M applications comprise Q pieces of APP ID-related information, M is a positive integer less than or equal to N, and Q is a positive integer greater than or equal to M;

obtain a matching value between each of the Q pieces of APP ID-related information and the keyword to obtain Q matching values, select L matching values that less than a first preset threshold value from the Q matching values, and delete one or more applications which comprise the APP ID-related information corresponding to the L matching values in the search result set, to update the search result set according to the Q pieces of APP ID-related information, wherein L is a positive integer less than or equal to M; and the output device is configured to send the updated search result set.

14. The server of claim 7, wherein the processor is configured to search history search records to obtain K search request records each containing the keyword, and update the search result set according to the K search request records, to update the search result set according to the Q pieces of APP ID-related information, wherein K is a positive integer.

15. The server of claim 14, wherein the processor is configured to:

obtain search times of each of the Q pieces of APP ID-related information from the K search request records to obtain Q search times;

select L search times less than a second preset threshold from the Q search times, wherein L is a positive integer less than or equal to M; and delete one or more applications which comprise the APP ID-related information corresponding to the L search times in the search result set.

16. The server of claim 14, wherein the processor is configured to:
    obtain search times of target APP ID-related information, when the K search request records contain one or more target applications corresponding to the target APP ID-related information which are inconsistent with the Q pieces of APP ID-related information; and
    add the one or more target applications to the search result set, when the search times of the target APP ID-related information are greater than or equal to a second preset threshold.

17. The server of claim 13, wherein the APP ID-related information comprises at least a previous name information and an alias information of an application.

18. A computer program product, wherein the computer program product comprises a non-transitory computer-readable storage medium storing a computer program, the computer program is operable to cause a computer to perform an information processing method, the method comprises:
    receiving a search request containing a keyword;
    searching in a preset application library to obtain a search result set according to the keyword, wherein the search result set comprises N applications and N is a positive integer;
    obtaining M applications from the N applications, wherein the M applications each comprises at least one application identification (APP ID)-related information and thereby the M applications comprise Q pieces of APP ID-related information, M is a positive integer less than or equal to N, and Q is a positive integer greater than or equal to M;
    updating the search result set according to the Q pieces of APP ID-related information, comprising:
    searching history search records to obtain K search request records each containing the keyword, wherein K is a positive integer;
    obtaining search times of target APP ID-related information, when the K search request records contain one or more target applications corresponding to the target APP ID-related information which are inconsistent with the Q pieces of APP ID-related information; and
    adding the one or more target applications to the search result set, when the search times of the target APP ID-related information are greater than or equal to a second preset threshold; and
    sending the updated search result set.

19. The computer program product of claim 18, wherein the operation of updating the search result set according to the Q pieces of APP ID-related information, further comprising:
    obtaining search times of each of the Q pieces of APP ID-related information from the K search request records to obtain Q search times;
    selecting L search times less than a second preset threshold from the Q search times, wherein L is a positive integer less than or equal to M; and
    deleting one or more applications which comprise the APP ID-related information corresponding to the L search times in the search result set.

20. The computer program product of claim 18, wherein the operation of updating the search result set according to the Q pieces of APP ID-related information, further comprising:
    obtaining a matching value between each of the Q pieces of APP ID-related information and the keyword to obtain Q matching values;
    selecting L matching values that less than a first preset threshold value from the Q matching values, wherein L is a positive integer less than or equal to M;
    deleting one or more applications which comprise the APP ID-related information corresponding to the L matching values in the search result set.

* * * * *